US012668195B2

(12) United States Patent
Sirrenberg

(10) Patent No.: US 12,668,195 B2
(45) Date of Patent: Jun. 30, 2026

(54) ROOF RACK FOR A MOTOR VEHICLE, MOTOR VEHICLE, AND METHOD FOR PRODUCING A ROOF RACK

(71) Applicant: FYSAM Auto Decorative GmbH, Steinheim am Albuch (DE)

(72) Inventor: Stefan Sirrenberg, Neckargerach (DE)

(73) Assignee: FYSAM AUTO DECORATIVE GMBH, Steinheim am Albuch (DE)

( * ) Notice: Subject to any disclaimer, the term of this patent is extended or adjusted under 35 U.S.C. 154(b) by 232 days.

(21) Appl. No.: 18/271,968

(22) PCT Filed: Jan. 14, 2022

(86) PCT No.: PCT/EP2022/050725
§ 371 (c)(1),
(2) Date: Jul. 12, 2023

(87) PCT Pub. No.: WO2022/152834
PCT Pub. Date: Jul. 21, 2022

(65) Prior Publication Data
US 2024/0116450 A1 Apr. 11, 2024

(30) Foreign Application Priority Data

Jan. 15, 2021 (DE) .......................... 102021200375.3

(51) Int. Cl.
*B60R 9/04* (2006.01)

(52) U.S. Cl.
CPC ...................................... *B60R 9/04* (2013.01)

(58) Field of Classification Search
CPC ...................................................... B60R 9/04
See application file for complete search history.

(56) References Cited

U.S. PATENT DOCUMENTS

| | | | |
|---|---|---|---|
| 4,767,040 A | 8/1988 | Miller et al. | |
| 5,636,954 A | 6/1997 | Henderson et al. | |

(Continued)

FOREIGN PATENT DOCUMENTS

| | | | |
|---|---|---|---|
| DE | 3306360 A1 | 9/1984 | |
| DE | 4422421 C1 | 9/1995 | |

(Continued)

OTHER PUBLICATIONS

International Search Report issued in corresponding International Application No. PCT/EP2022/050725, dated Apr. 20. 2022, pp. 1-2, English Translation.

(Continued)

*Primary Examiner* — Justin M Larson
(74) *Attorney, Agent, or Firm* — Carter, DeLuca & Farrell LLP; George Likourezos

(57) ABSTRACT

The invention relates to a roof rack for a motor vehicle, having at least one roof rail and at least one fastener for end fastening of the roof rail to a roof of the motor vehicle, the fastener having a fastening device, which is fastened to the roof rail and can be fastened to the roof, and an adapter component, which at least partially accommodates the fastening device. According to the invention, the adapter component is in the form of an injection moulded component, and the fastening device is present in overmoulded form in the adapter component. The invention also relates to a motor vehicle with a roof and a roof rack attached to the roof, as well as a method for producing a roof rack.

9 Claims, 3 Drawing Sheets

(56)         References Cited

U.S. PATENT DOCUMENTS

Figure 1:
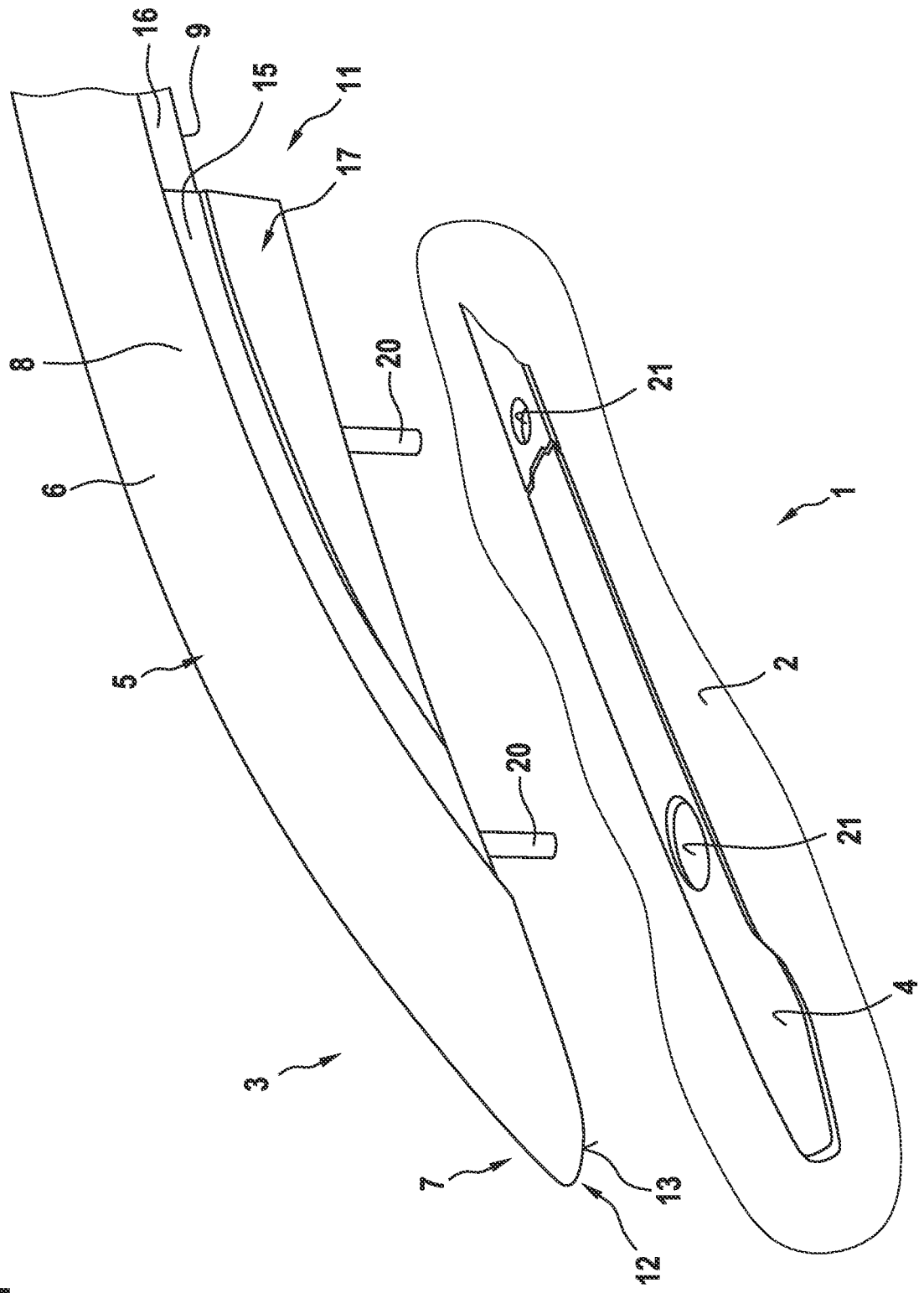

| | | | | |
|---|---|---|---|---|
| 5,699,944 | A * | 12/1997 | Duran ........................ | B60R 9/04 |
| | | | | 411/908 |
| 6,338,428 | B1 * | 1/2002 | Kawasaki ................. | B60R 9/04 |
| | | | | 224/326 |
| 9,327,653 | B2 * | 5/2016 | Sirrenberg ................ | B60R 9/04 |
| 9,352,696 | B2 * | 5/2016 | Gorey ....................... | B60R 9/04 |
| 11,046,254 | B2 * | 6/2021 | Chenaud ................. | B60R 9/058 |
| 2015/0129625 | A1 | 5/2015 | Gorey et al. | |
| 2018/0222396 | A1 * | 8/2018 | Binder ...................... | B60R 9/04 |
| 2024/0025348 | A1 * | 1/2024 | Sirrenberg ............. | B60R 9/058 |
| 2024/0116450 | A1 * | 4/2024 | Sirrenberg ............... | B60R 9/04 |

FOREIGN PATENT DOCUMENTS

| | | | |
|---|---|---|---|
| DE | 4441802 | C1 | 12/1995 |
| DE | 19732288 | A1 | 2/1999 |
| DE | 112018004334 | T5 | 5/2020 |
| JP | 2005-145124 | A | 6/2005 |
| JP | 2007253928 | A | 10/2007 |
| JP | 201719456 | A | 1/2017 |

OTHER PUBLICATIONS

International Preliminary Report on Patentability issued by the International Bureau of WIPO in connection with International Application No. PCT/EP2022/050725, dated Jul. 4, 2023.
Japanese Office Action issued by the Japanese Patent Office in connection with International Application No. 2023-542517, dated Aug. 19, 2025.
Chinese Office Action issued by the National Intellectual Property Administration in connection with International Application No. 202280010188.0, dated Aug. 21, 2025.

* cited by examiner

ROOF RACK FOR A MOTOR VEHICLE, MOTOR VEHICLE, AND METHOD FOR PRODUCING A ROOF RACK

CROSS REFERENCE TO RELATED APPLICATIONS

The present application is a national stage application of International Application No. PCT/EP2022/050725, filed Jan. 14, 2022, which claims priority to German Patent Application No. 102021200375.3, filed Jan. 15, 2021, the entire contents of which are incorporated herein by reference in their entirety.

The invention relates to a roof rack for a motor vehicle, having at least one roof rail and at least one fastener for end fastening of the roof rail on a roof of the motor vehicle, the fastener having a fastening device, which is fastened to the roof rail and can be fastened to the roof, and an adapter component, which at least partially accommodates the fastening device. The invention also relates to a motor vehicle having a roof and a roof rack attached to the roof, and to a method for producing a roof rack.

From the prior art, for example, document WO 2013/107683 A1 is known. This document describes a roof rack for a motor vehicle, with at least one roof rail and with at least one support element fastened to the roof rail for bridging a distance formed between the roof rail and the roof of the motor vehicle and for fixing the roof rack to the roof of the motor vehicle, and with at least one cover for the support element, the roof rail, support element and cover being designed as separate components. It is provided that at least one end region of the roof rail is formed as a curved section, the end face of which forms a roof contact end, that the support element is formed as an extruded component and that the support element and cover are located at least partially in the region of the curved section.

It is the objective of the invention to propose a roof rack for a motor vehicle, which has advantages over known roof racks, in particular which can be fixed to the roof of the motor vehicle in a particularly reliable and durable manner and which has a particularly pleasing visual design.

This is achieved according to the invention with a roof rack for a motor vehicle having the features of claim 1. It is provided that the adapter component is designed as an injection moulded component and the fastening device is present in overmoulded form in the adapter component.

Advantageous configurations with expedient further embodiments of the invention are indicated in the dependent claims.

The roof rack is preferably part of the motor vehicle, but can of course also be separate from it. The roof racks are used, for example, to attach a roof rack to the motor vehicle. In this case, the roof rack is supported on the roof of the motor vehicle via the roof racks. However, the roof racks can of course also be arranged on the motor vehicle for purely visual reasons.

The roof rack comprises at least the at least one roof rail and the at least one fastener. The roof rail is understood to be a component of the roof rack which, after the roof rack has been mounted on the motor vehicle, preferably extends in the longitudinal direction of the motor vehicle or at least approximately in the longitudinal direction, that is, is arranged parallel or approximately parallel to a longitudinal axis of the motor vehicle. In this case, the roof rail extends over a substantial part of an extension of the roof in the direction of the longitudinal axis, preferably over at least 70%, at least 80% or at least 90%. However, other orientations and extensions of the roof rail are also feasible in principle. The roof rail preferably has a top side facing away from the fastener as seen in section, side walls extending from the top side and a bottom wall resting on a support surface of the fastener. The top side and the bottom wall are connected to each other via the side walls.

For example, the roof rail is designed in such a way that it is supported on the roof of the motor vehicle over at least a large part of its longitudinal extension, in particular continuously or uninterruptedly, after the roof rack has been mounted on the motor vehicle. Preferably, the roof rail is supported on the roof of the motor vehicle over its entire longitudinal extent. However, it is also possible for the roof rail to be supported on the roof of the motor vehicle only partially, in particular only on one side by means of the fastener or by means of several fasteners. It is also possible that the roof rail is supported at the end on the roof by means of the fastener and is only spaced from the roof in certain areas between the fastener. The roof racks presented here can basically be used for all of the aforementioned designs of the roof rail.

The roof rail is preferably supported on the roof by means of a protective film, in particular made of plastic, in particular of an elastomer and/or a foam, which reliably prevents damage to the roof by the roof rack or, conversely, damage to the roof rack by the roof and/or creates a waterproof connection between the roof rack and the roof of the motor vehicle, so that the penetration of moisture from an external environment of the motor vehicle via the roof rack or via a fastening of the roof rack to the roof is prevented. The protective film can be regarded as part of the roof for the purposes of this description. Therefore, if it is mentioned that the roof racks are supported on the roof, this can be done directly without the protective film or preferably via the protective film. In the former case, the roof racks rest directly on the roof, in the latter case on the protective film arranged on the roof.

The roof rail is fastened or can be fastened at the end to the roof of the motor vehicle with the aid of the at least one fastener. The term "end fastening" means that the fastener engages one end of the roof rail and connects it to the roof of the motor vehicle. In other words, the fastener is arranged at one end of the roof rail or fastened to it. By fastening it is to be understood that the roof rail is completely fixed by means of the fastener, that is in the direction of a longitudinal axis, a vertical axis, and a transverse axis of the motor vehicle, and allows or permits no play or at most a slight play between the roof rail and the roof.

Particularly preferably, the roof rail is fastened to the roof of the motor vehicle with several fasteners. Each of the fasteners serves to end fasten the roof rail to the roof, so that the several fasteners act on spaced ends of the roof rail and fix it with respect to the roof. A region of the roof rail present between the regions of the roof rail fastened by means of the fasteners is supported, for example, at least partially, preferably continuously or only partially, on the roof of the motor vehicle or is continuously spaced from the roof. In any case, the roof rail is supported on the roof at least at the ends via the fastener, in particular the roof rail itself rests there on the roof of the motor vehicle or on the protective film.

Particularly preferably, the roof racks have several roof rails which are arranged on the roof of the motor vehicle, in particular spaced parallel to each other. Each of these roof rails is end fastened to the roof of the motor vehicle by means of at least one fastener. Preferably, several fasteners are used for fastening each of the roof rails, in particular exactly two fasteners. In this respect, the invention also relates to a roof rack for a motor vehicle, having at least one roof rail and a plurality of fasteners for respectively end fastening the roof rail to a roof of the motor vehicle, each of the fasteners having a fastening device which is fastened to the roof rail and can be fastened to the roof, and an adapter component which accommodates the fastening device at least partially. In this case, it is again provided that the respective adapter component is designed as an injection-moulded component and the respective fastening device is present in the corresponding adapter component in over-moulded form.

The adapter component is basically designed as an injection moulded component. This means that the adapter component is manufactured by injection moulding. The fastening device is present in overmoulded form in the adapter component. This means that the fastening device is provided before the adapter component is manufactured and is overmoulded with an injection moulding material during the production of the adapter component, so that the adapter component with the fastening device arranged in it is available immediately after injection moulding. The fastening device is present in overmoulded form in the adapter component in such a way that it is positively held therein. Particularly preferably, the fastening device is completely received in the adapter component, so that the fastening device at least does not protrude beyond the adapter component. In this case, it may well be envisaged that the fastening device is visible from an external environment of the adapter component. Preferably, however, the fastening device is completely received in the envelope of the adapter component or is at most aligned therewith. The envelope may also be referred to as the contour of the adapter component.

Preferably, the adapter component and the fastening device are made of different materials. For example, the fastening device is made of metal, whereas the adapter component is made of plastic and is accordingly an injection moulded plastic component. For example, the fastening device is made of steel, preferably coated steel. For example, the steel is coated with zinc and/or nickel. In the case of the zinc-coated steel, it can also be referred to as galvanised steel. The steel used is preferably a micro-alloyed steel, for example S355MC according to DIN EN 10149-2. This steel can also be referred to as 1.0976. The plastic used for the adapter component is, for example, acrylonitrile-styrene-acrylate copolymer (ASA), in particular acrylonitrile-styrene-acrylate copolymer according to TL52311. The surface of the adapter component is preferably provided with a surface structure, in particular a grain, for example a K 31 grain, at least in some areas. Preferably, the grain is only realised in a visible area of the adapter component.

The fastening device can be realised in different ways. For example, it is present as a continuous component, which is in particular a strip, in particular a metal strip, or an extruded component. Preferably, the strip is in the form of a sheet metal strip. The continuous component is particularly preferably curved or bent. Accordingly, it has at least one bend or curvature, particularly preferably several bends or curvatures arranged in parallel. Alternatively, the fastening device has several reinforcing elements arranged at a distance from one another.

The extruded component is preferably in the form of an extruded part, that is it is produced by extrusion. This means that the extruded component has a continuously constant cross-section in one direction, namely in an extrusion direction in which the extruded component is produced by extrusion. Preferably, the extrusion process is first used to produce a blank, which is divided into several extruded components, which are in particular identical, by separating them in planes arranged parallel to one another. The design of the extruded component as an extruded part enables a particularly high strength with low manufacturing costs at the same time.

If the fastening device is designed as an extruded component or extruded part, it can only be adapted in one direction to a contour of the roof and the roof rail. In this case, the adapter component serves to adapt the component to the roof or the roof rail. For example, it is envisaged that identically designed fastening devices are used for a plurality of roof racks, whereby these in particular have differently designed roof rails. Each of the roof racks has an adapter component which adapts the respective fastening device to the different roof rails. Accordingly, the fastening device can be produced in large quantities, resulting in a cost advantage.

The design of the adapter component as an injection moulded component ensures a high degree of flexibility in the design of the adapter component, so that the fastener is adapted extremely precisely to the roof rail and/or the roof almost independently of the design of the fastening device. As a result, on the one hand a high strength of the connection between the roof rail and the roof is achieved, namely due to the use of the fastening device, and on the other hand a particularly pleasing visual impression of the roof rack is achieved. Due to its design as an injection moulded component, the adapter component is manufactured in one piece and as a uniform material. In this respect, the adapter component does not consist of several parts that are fastened to each other, for example by positive and/or material locking. Rather, the adapter component is already manufactured in one piece, that is as a single element. This also leads to a cost-effective and efficient production.

In conventional roof racks, only the fastening device serves to support and fasten the roof rail, whereas the adapter component—if present at all—only serves to visually conceal the fastening device. According to the invention, however, the adapter component also has a supporting effect, in particular the fastening device and consequently the roof rail are supported on the roof of the motor vehicle via the adapter component. For example, it is intended that the roof rail rests directly against the adapter component and/or the fastening device. Particularly preferably, the roof rail is arranged at a continuous distance from the fastening device as seen in longitudinal section and is supported on the adapter component. The roof rail is fastened to the fastening device by means of screw connectors. Additionally or alternatively, it is provided that the fastening device is supported on the roof directly or only indirectly via the adapter component. A particularly preferred design of the roof racks is one in which the fastening device rests directly on the roof in some areas and is supported on the roof only indirectly in some areas via the adapter component.

It is therefore intended that the roof rail is fastened to the fastening device, whereby the fastening device in turn is supported on or fastened to the roof of the motor vehicle after the roof racks have been mounted on the motor vehicle. It may be provided that the fastening device is supported exclusively directly on the roof of the motor vehicle, that is it rests directly on the roof or on the protective film. Preferably, however, the fastening device is at least partially supported on the roof via the adapter component. Particularly preferably, at least a large part of the fastening device is spaced from the roof by means of the adapter component, so that at most a small part of the fastening device is supported directly on the roof or the protective film, whereas the rest of the fastening device is supported on the roof or the protective film exclusively via the adapter component. This reliably prevents damage to the roof by the fastening device.

A further embodiment of the invention provides that the fastening device has a plurality of first fastening recesses and a plurality of second fastening recesses, the first fastening recesses being provided and designed for receiving first screw connectors serving to fasten the fastener to the roof rail and the second fastening recesses being provided and designed for receiving second screw connectors serving to fasten the fastener to the roof. The fastening has several fastening recesses, namely several first fastening recesses and several second fastening recesses and several second fastening recesses. The fastening recesses are designed as through-holes, that is they each completely penetrate the fastening device.

The first screw connectors, by means of which the fastening device is fastened to the roof rail, are arranged in the first fastening recesses. In the second fastening recesses, on the other hand, the second screw connectors are arranged, by means of which the fastening device can be fastened or is fastened to the roof. The screw connectors, that is the first screw connectors and the second screw connectors, are preferably screws or bolts. Accordingly, each of the screw connectors has at least one screw connector head and a screw connector thread.

The fastening recesses, that is both the first fastening recesses and the second fastening recesses, are arranged at a distance from each other. Preferably, their longitudinal centre axes lie in a common imaginary plane. Additionally, their longitudinal central axes may be parallel to each other. Preferably, however, the longitudinal central axes of at least some of the fastening recesses, in particular those in the common imaginary plane, are angled relative to one another, that is they enclose an angle which is greater than 0° and less than 180°.

A further embodiment of the invention provides that each of the second fastening recesses is embraced by a respective edge surface of the fastening device which is flush with or projects beyond an underside of the adapter component in the direction away from the roof rail. The edge surface of the fastening device is to be understood as a surface of the fastening device which forms a continuous edge of the respective second fastening recess. The edge surface thus completely surrounds the corresponding second fastening recess without interruption. In this respect, the edge surface is annular, in particular circular. Particularly preferably, the fastening device is supported on the roof of the motor vehicle or the protective film via the edge surfaces. Accordingly, it is aligned with or even protrudes over the underside of the adapter component facing away from the roof rail in longitudinal section. After mounting the roof racks on the roof of the motor vehicle, at least the edge surfaces of the fastening device thus lie against the roof. Preferably, the underside of the adapter component is also in contact with the roof, at least partially. Such a design enables a particularly reliable and permanent connection of the roof rack to the motor vehicle.

A further embodiment of the invention provides that the adapter component has first screw connector head receptacles in which heads of the first screw connectors are arranged at a distance from the underside of the adapter component. The first screw connectors serve to attach the fastening device to the roof rail. Preferably, the first screw connectors engage with their screw connector thread on the roof rail directly or at least indirectly via, for example, a threaded sleeve or the like. In any case, the screw connector heads of the first screw connectors are located on the side of the fastening device facing away from the roof rail in longitudinal section. On this side, the adapter component has the first screw connector head receptacles. These are dimensioned in such a way that the first screw connectors and in particular their screw connector heads are arranged at a distance from the roof after the roof racks have been mounted on the motor vehicle. This prevents damage to the roof by the first screw connectors, in particular scratching of the roof.

A further embodiment of the invention provides that the first screw connector head receptacles are closed off from the roof of the motor vehicle after the roof rack has been arranged on the motor vehicle. When the roof rack is arranged as intended, the first screw connector head receptacles have mouth openings on their side facing the roof, which pass through an underside of the adapter component. These mouth openings are closed by the roof of the motor vehicle. This means in particular that the roof rests against the adapter component in such a way that it covers or engages over the mouth openings. Particularly preferably, the roof completely covers the mouth openings. For example, the edges defining the mouth openings, which are formed by the adapter component, are in contact with the roof, in particular continuously or uninterruptedly.

Alternatively, the mouth openings are arranged at a distance from the roof. In this case, however, the distance of the mouth openings from the roof is comparatively small Preferably, it corresponds at most to a diameter of the first screw connectors, in particular it is smaller. For example, it corresponds at most to the diameter of the first screw connectors multiplied by a factor of 0.75, 0.5 or 0.25. In any case, the first screw connector head receptacles are particularly preferably dimensioned in such a way that the first screw connectors come into contact with the roof before they disengage from the roof rail. This is a particularly effective way of securing the roof racks against unintentional loosening.

A further embodiment of the invention provides that the fastening device is designed as a continuous component or has several reinforcing elements which are accommodated at a distance from one another in the adapter component and have the fastening recesses. A corresponding design of the fastening device has already been referred to. In the case of the continuous component, the roof rail is directly attached to the roof via the fastening device. This means that the fastening device is attached to the roof rail on the one hand and to the roof on the other, so that forces acting between the roof rail and the roof are transmitted continuously via the fastening device.

If, on the other hand, the fastening device has the reinforcing elements, there is no continuous component. Rather, some of the reinforcing elements are attached to the roof rail and others of the reinforcing elements are attached to the roof and are accommodated at a distance from each other in the adapter component. The forces acting between the roof rail and the roof are therefore not transmitted continuously via the fastening device, but at least partially via the adapter component, since the reinforcing elements connected to the roof rail on the one hand and the reinforcing elements connected or connectable to the roof on the other hand are connected or fastened to each other exclusively via the adapter component.

The fastening device designed as a continuous component is characterised by high strength, whereas the fastening device comprising the reinforcing elements can be realised at a particularly low cost and is lightweight. Particularly preferably, the continuous component is an extruded part or a strip.

A further embodiment of the invention provides that the reinforcing elements are designed as bushes having in each case at least one form-fitting collar overmoulded with the adapter component at least partially, wherein the bushes having the second fastening recesses in each case additionally have a further form-fitting collar spaced from the form-fitting collar and the adapter component engages positively between the form-fitting collar and the further form-fitting collar. The reinforcing elements are thus in the form of bushes in which the fastening recesses are formed. Each of the bushes has at least one form-fitting collar, by which is to be understood a web-like projection which extends from a base body of the respective bush. The form-fitting collar is, for example, a circumferential web and thus an annular web.

The form-fitting collar is arranged in the adapter component for fastening the respective bushing, that is it engages positively in the latter. At least those bushes in which second fastening recesses are formed have the additional form-fitting collar in addition to the form-fitting collar. The form-fitting collar and the further form-fitting collar are arranged at a distance from each other, in particular at a parallel distance. The further form-fitting collar can be designed in accordance with the embodiments of the form-fitting collar. The adapter component engages positively between the form-fitting collar and the further form-fitting collar in order to positively fasten the corresponding bushing. It is particularly preferred that one of the form-fitting collars, for example the other form-fitting collar, is flush with the underside of the adapter component. This creates a fastening point for securely fastening the roof racks to the roof.

Preferably, the bushings in which the first fastening recesses are formed have a different design than the bushings in which the second fastening recesses are present. In particular, the bushings having the first fastening recesses only have the form-fitting collar, but not the further form-fitting collar. Preferably, the form-fitting collar is formed centrally or at least approximately centrally on the respective bushing in the direction of a longitudinal central axis thereof. On the other hand, on the bushings having the second fastening recesses, the form-fitting collar and the further form-fitting collar are preferably arranged off-centre, in particular on the end side in each case. This means that the form-fitting collar and the further form-fitting collar are arranged at opposite ends of the respective bushing. This achieves reliable fastening of the reinforcing elements both to the roof rail and to the roof of the motor vehicle.

A further embodiment of the invention provides that the roof rail has a top side facing away from the fastener as seen in cross-section, side walls extending from the top side and a bottom wall resting on a support surface of the fastener. Seen in cross-section, the roof rail can be roughly divided into the top side, the side walls and the bottom wall. The top side and the bottom wall are connected to each other via the side walls. Seen in cross-section, for example, the top side, the side walls and the bottom wall form a closed contour at least partially. The roof rail is supported on the support surface of the fastener. The support surface is formed on the adapter component. The support surface is preferably adapted to the shape and dimensions of the bottom wall of the roof rail, so that the bottom wall is in flat contact with the support surface.

A further embodiment of the invention provides that the first fastening recesses extend through the support surface. In this respect, mouth openings of the first fastening recesses, which are present on the side of the fastener or of the adapter component facing the roof rail, are delimited by the support surface. In other words, edges of the mouth openings are formed by the support surface. This enables a compact and visually inconspicuous fastening of the roof rail by means of the fastening device.

A further embodiment of the invention provides that the adapter component has at least one support wall projecting beyond the support surface, against which one of the side walls of the roof rail or a side wall extension extending from one of the side walls of the roof rail rests for lateral guidance of the roof rail with respect to the adapter component. In order to improve the lateral guidance of the roof rail with respect to the adapter component, the support wall is formed on the adapter component, which protrudes beyond the support surface, namely in the direction facing away from the roof of the motor vehicle. One of the side walls of the roof rail, for example, rests against this support wall.

Alternatively, the side wall extension extends from the side wall of the roof rail and is supported on the support wall. The side wall extension means an extension of the side wall that extends from the respective side wall in the direction of the roof of the motor vehicle. Preferably, the side wall extension is arranged offset with respect to the corresponding side wall, in particular arranged parallel offset. The described design of the roof rack facilitates on the one hand the alignment of the roof rail during assembly and on the other hand it ensures a reliable attachment of the roof rail to the roof.

A further embodiment of the invention provides that the side wall and the side wall extension are connected via a bend of the roof rail overlapping the support wall. It has already been mentioned above that the side wall and the side wall extension are preferably offset from each other, in particular parallel offset. This offset is achieved with the help of the bend. The bend is understood to be a region of the roof rail in which a width of the roof rail decreases starting from the side wall in the direction of the side wall extension. In this respect, the bend achieves a tapering of the roof rail in cross-section in the direction of the roof.

A further embodiment of the invention provides that the adapter component has second screw connector head receptacles adjoining the second fastening recesses, in which screw connector heads of the second screw connectors are arranged and held in a form-fitting manner in a rotationally fixed manner. The second screw connectors serve to fasten the fastener to the roof of the motor vehicle. They are arranged in the second fastening recesses of the fastening device. Usually, the fastener is first mounted on the roof rail and then the assembly of fastener and roof rail is placed on the roof of the motor vehicle. This makes it necessary that the second screw connectors are already arranged on the fastener in order to be able to fasten the fastener quickly and reliably to the roof. Accordingly, it is intended that the second screw connectors are inserted into the second fastening recesses before the fastener and the roof rail are fastened to each other. Only then is the fastener fastened to the roof rail and subsequently the assembly of fastener and roof rail is arranged on the roof.

In order to prevent a rotational movement of the second screw connectors during the fastening of the roof racks to the roof, the adapter component is designed in such a way that it holds the screw connector heads of the second screw connectors in a form-fitted, rotationally fixed manner. For this purpose, the adapter component has the second screw connector head receptacles which are adapted in shape and dimension to the screw connector heads of the second screw connectors, namely at least in such a way that the positive retention of the second screw connectors on the adapter component is realised. In particular, at least one of the second fastening recesses is arranged in such a way that, after fastening of the fastener to the roof rail, it is overlapped by the roof rail, in particular the bottom wall of the roof rail, at least in certain areas. Accordingly, at least one of the two screw connectors is held by the roof rail on the adapter component in such a way that it cannot be lost. The described design of the roof rack ensures simple and quick mounting on the roof of the motor vehicle.

A further embodiment of the invention provides that the adapter component has an extension which projects beyond the support surface and engages in a foot region of the roof rail facing the roof, wherein the foot region has a foot surface facing the roof which engages around the extension in a U-shape and is flush with the underside of the adapter component or projects beyond it in the direction facing the roof. The extension is part of the adapter component. For example, the extension extends directly from the support surface. However, it can also be arranged at a distance from the support surface. In any case, it engages in the foot area of the roof rail in order to secure it reliably, in particular in order to realise a lateral guide for the foot area.

In the foot area, the roof rail rests against the roof after the roof rack has been mounted on the motor vehicle or at least has the smallest distance between the roof rail and the roof, seen over the extension of the roof rail in the longitudinal direction. The foot area ends in the foot surface, which is formed on the side of the roof rail facing the roof. The foot area can be continuous and lie completely in an imaginary plane. Preferably, however, the foot surface is curved in itself. In this case, it has a continuous course.

Preferably, the foot surface is in continuous and complete contact with the roof after the roof rack has been mounted on the motor vehicle. The foot area is U-shaped and surrounds the extension of the adapter component. Particularly preferably, the extension lies continuously against the foot area. The foot area can protrude over the adapter component or its underside in the direction facing the roof. Preferably, however, it is flush with it. On the one hand, this ensures reliable fastening of the roof racks to the motor vehicle and, on the other hand, an extremely pleasing visual impression.

A particularly preferred embodiment of the roof rack for a motor vehicle has at least one roof rail and at least one fastener for end fastening of the roof rail to a roof of the motor vehicle, the fastener having a fastening device which is fastened to the roof rail and can be fastened to the roof and an adapter component which receives the fastening device at least partially, wherein the roof rail has an top side facing away from the fastener as seen in section, side walls extending from the top side and a bottom wall connected to the top side via the side walls, and wherein the adapter component is designed as an injection moulded component and the fastening device is present in overmoulded form in the adapter component. In this case, it is provided that the bottom wall bears flat against a support surface of the adapter component, and that the fastening device has a plurality of first fastening recesses passing through the support surface and a plurality of second fastening recesses, the first fastening recesses being provided and designed to receive first screw connectors serving to fasten the fastener to the roof rail and the second fastening recesses being provided and designed to receive second screw connectors serving to fasten the fastener to the roof, and wherein the adapter component has, on its side facing away from the roof rail in longitudinal section, first screw connector head receptacles in which screw connector heads of the first screw connectors are arranged at a distance from an underside of the adapter component.

The invention further relates to a motor vehicle with a roof and a roof rack fastened to the roof, in particular a roof rack according to the embodiments within the scope of this description, wherein the roof rack has at least one roof rail and at least one fastener for end fastening of the roof rail to a roof of the motor vehicle, wherein fastener has a fastening device fastened to the roof rail and to the roof and an adapter component receiving the fastening device at least partially. It is provided that the adapter component is designed as an injection moulded component and the fastening device is present in overmoulded form in the adapter component.

The advantages of such a design of the motor vehicle or the roof racks have already been pointed out. Both the motor vehicle and the roof racks can be further designed in accordance with the explanations in this description, so that reference is made to the latter.

The invention also relates to a method for producing a roof rack, in particular a roof rack as described herein, wherein the roof rack has at least one roof rail and at least one fastener for end fastening of the roof rail to a roof of the motor vehicle, wherein the fastener has a fastening device which is fastened to the roof rail and can be fastened to the roof and an adapter component which accommodates the fastening device at least partially. It is provided that the adapter component is formed as an injection moulded component and the fastening device is overmoulded with the adapter component so that it is present in overmoulded form in the adapter component.

Again, regarding the advantages and possible advantageous further embodiments of the method and the roof rack, reference is made to the explanations within the scope of this description.

The features and combinations of features described in the description, in particular the features and combinations of features described in the following figure description and/or shown in the figures, can be used not only in the respective combination indicated, but also in other combinations or on their own, without leaving the scope of the invention. Thus, embodiments which are not explicitly shown or explained in the description and/or the figures, but which result from the explained embodiments or can be derived from them, are also to be regarded as within the scope of the invention.

The invention is explained in more detail below with reference to the examples of embodiments shown in the drawing, without any limitation of the invention. Thereby shows FIG. 1 a schematic representation of a motor vehicle with a roof rack attached to a roof of the motor vehicle, FIG. 2 a schematic longitudinal sectional view of a first embodiment of the roof rack, with a fastener for attaching a roof rail to the roof, FIG. 3 a schematic representation of the fastener for the first embodiment of the roof rack, FIG. 4 a schematic longitudinal sectional view of the roof rack in a second embodiment, and FIG. 5 a schematic representation of the fastener for the second embodiment of the roof rack.

FIG. 1 shows a schematic representation of a motor vehicle 1 which has a roof 2 and a roof rack 3. The roof rack 3 is attached to the roof 2. A protective film 4 is arranged between the roof 2 and the roof rack 3 to prevent mutual damage to the roof 2 and the roof rack 3. The protective film 4 can also be considered as part of the roof 2, so that the roof 2 has the protective film 4 in areas, namely where the roof rack 3 is supported on or touches the roof 2. The roof rack 3 has a roof rail 5. In principle, the roof rack 3 can have any number of roof rails 5. In this case, the several roof rails 5 preferably run parallel to each other. In the following, only the roof rail 5 will be discussed. If there are several roof rails 5, the explanations can be applied analogously to each of these roof rails 5.

On its side facing away from the roof 2, the roof rail 5 has a top side 6 which is curved in the direction of one end 7 of the roof rail 5 towards the roof 2. In particular—as shown— the entire roof rail is curved in the direction of the roof 2. Side walls 8 extend from the top side 6, of which only one is visible here. The side walls 8 run parallel to one another and preferably extend over a large part of the length of the roof rail 5. The roof rail 5 is bounded at the bottom, at least in certain areas, by a bottom wall 9, which is connected to the top side 6 via the side walls 8. The bottom wall 9 preferably has a smaller extension in the longitudinal direction of the roof rack 3 than the top side 6 and the side walls 8. This forms a recess 10 in the area of the end 7 of the roof rail 5 which is not visible here.

The end of the roof rail 5 is attached to the roof by means of a fastener 11. Preferably, the fastener 11 also engages in the recess 10 for this purpose. The top side 6 of the roof rail 5 is on the side of the roof rail 5 facing away from the fastener 11, whereas the bottom wall 9 faces the fastener 11 or is arranged on the side of the roof rail 5 facing the fastener 11. In particular, the bottom wall 9 rests on a support surface 29 of the fastener 11, which is not shown here, so that the roof rail 5 is supported on it.

For example, the end 7 of the roof rail 5 has a foot area 12 in which a foot surface 13 is formed on the roof rail 5, which is essentially U-shaped. Preferably, the roof rail 5 is supported directly on the roof 2 or the protective film 4 by means of the foot surface 13. For this purpose, the foot surface 13 is curved, for example, so that it is adapted to the shape of the roof 2. The foot surface 13 engages around a region of the fastener 11, namely an extension 14, in order to realise lateral guidance of the roof rail 5 also at its end 7. Further lateral guidance of the roof rail 5 with respect to the fastener 11 is incidentally achieved by means of a support wall 15, which is a component of the fastening device 11 and against which the side wall 8 or—as in the embodiment example shown here—a side wall extension 16 lies flat. The support wall is part of an adapter component 17 of the fastener 11.

In addition to the adapter component 17, the fastener 11 has a fastening device 18, which is not visible here, however, as it is concealed by the adapter component 17. The adapter component 17 is in the form of an injection moulded component and accommodates the adapter component 17. In this case, the fastening device 18 is provided overmoulded in the adapter component 17 and is thus held in it in a form-fitting manner Preferably, the fastening device 18 is located completely within an envelope or within a contour of the adapter component 17, that is it does not protrude beyond the adapter component 17.

Finally, the roof rail 5 is fastened to the roof 2 by means of first screw connectors 19 and second screw connectors 20, whereby only the latter are visible here. The first screw connectors 19 serve to fasten the fastener 11 or, more precisely, the fastening device 18 to the roof rail 5. By means of the second screw connectors 20, on the other hand, the fastener 11 or, more precisely, the fastening device 18 is fastened to the roof 2. The first screw connectors 19 and the second screw connectors 20 engage at a distance from each other on the fastener 11 and the fastening device 18 respectively. Preferably, the protective film 4 has recesses 21 for the second screw connectors 20.

Figures 2, 3:
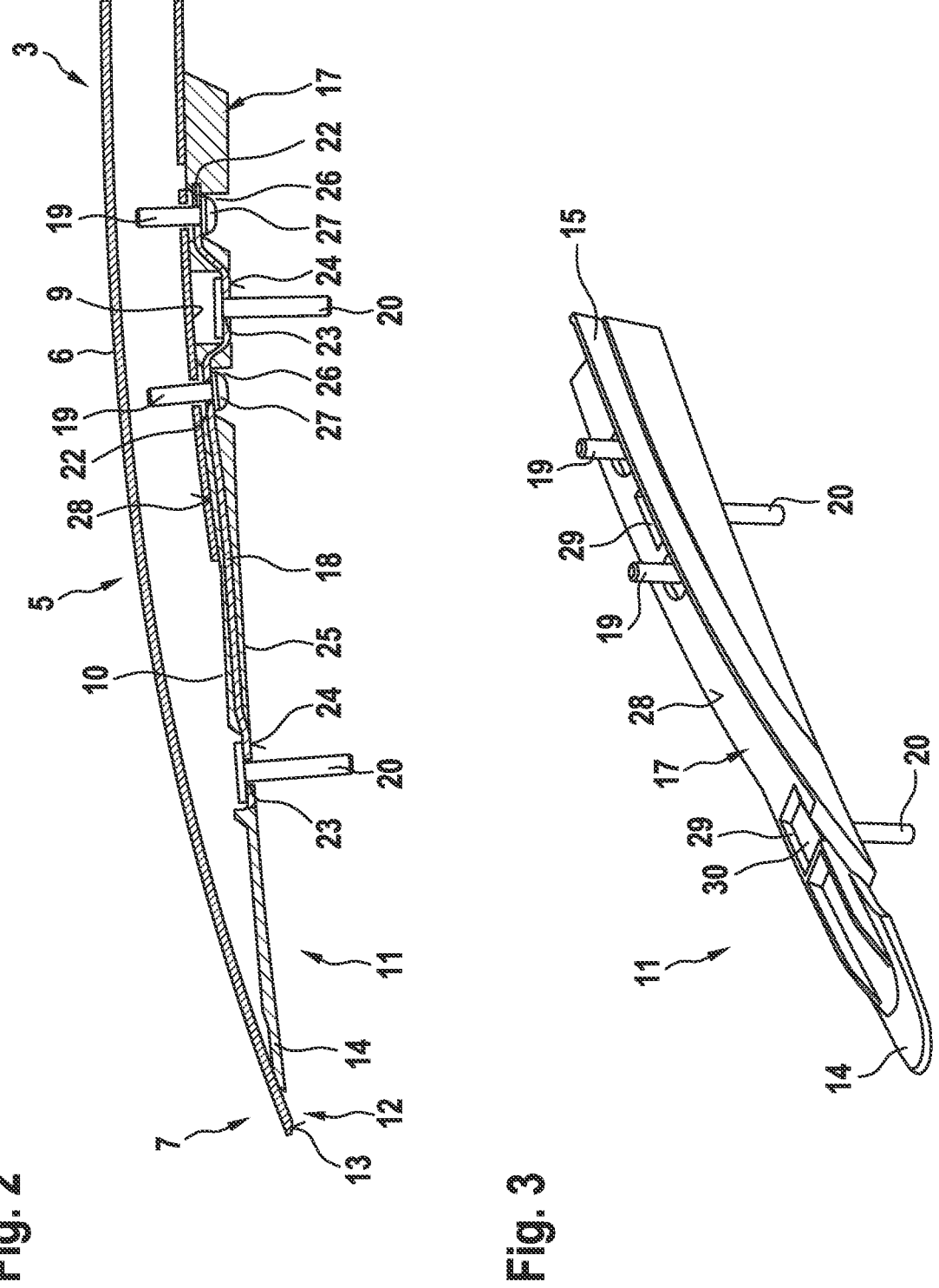

FIG. 2 shows a schematic longitudinal sectional view of a first embodiment of the roof rack 3. In the first embodiment, the now recognisable fastening device 18 is designed as a continuous component, in particular it is in the form of a bent sheet metal strip. By this is to be understood that the fastening device 18 has a constant material thickness throughout and has significantly larger dimensions in a first direction than in a second direction perpendicular to this first direction. The first direction and the second direction are in turn perpendicular to a third direction in which the material thickness is present. For example, the dimensions in the first direction are larger than the dimensions in the second direction by a factor of at least 5, at least 7.5 or at least 10.

The fastening device 18 has first fastening recesses 22 and second fastening recesses 23. The first screw connectors 19 are arranged in the first fastening recesses 22 and the second screw connectors 20 are arranged in the second fastening recesses 23. Seen in longitudinal section, the first fastening recesses 22 are arranged above the second fastening recesses 23, that is on the side facing the roof rail 5 of an imaginary longitudinal centre plane of the fastening device 18 or an imaginary plane intersecting the fastening device 18. In the embodiment example shown here, one of the second fastening recesses 23 is located in a bend region of the fastening device 18, in which the continuous component is bend in the direction of the roof 2 or in the direction facing away from the roof rail 5.

The second fastening recesses 23 are each completely and uninterruptedly surrounded by an edge surface 24 of the fastening device 18. In this respect, the edge surfaces are each annular. Preferably, the edge surfaces 24 each lie completely and continuously in an imaginary plane. Preferably, the edge surfaces 24 are aligned with an underside 25 of the adapter component 17 or even project over it in the direction facing away from the roof rail 5. This means that the roof rack 3 is supported on the roof 2 at least via the edge surfaces 24 or that the edge surfaces 24 are in direct contact with the roof 2. Particularly preferably, the fastening device 18 rests exclusively with its edge surfaces 24 against the roof 2 and is otherwise spaced from the roof 2, preferably in that its regions lying away from the edge surfaces 24 are accommodated in the adapter component 17 and at least do not project beyond its contour or envelope.

It can be seen that the roof rack 3 rests with its bottom wall 9 against the adapter component 17 and, in particular, is spaced from the latter by the fastening device 18. To this extent, the roof rail 5 is supported on the roof 2 via the adapter component 17 and/or the fastening device 18. In addition, it optionally rests with its foot surface 13 directly against the roof 2. In particular, it is intended that the adapter component 17 supports the roof rail 5 in the vertical direction, whereas the roof rail 5 is fixed by means of the fastening device 18, in particular in the longitudinal direction and in the transverse direction with respect to the roof 2. Of course, the fastening device 18 also prevents the roof rail 5 from being removed from the roof 2 in the vertical direction, that is a displacement of the roof rail 5 in the direction facing away from the roof 2. All in all, the roof rail 5 is thus securely and reliably fixed to the roof 2 by the interaction of the adapter component 17 and the fastening device 18.

In order to prevent damage to the roof 2 by the first screw connectors 19, first screw connector head receptacles 26 are present in the adapter component 17, namely on the side of the fastening device 18 facing away from the roof rail 5. Screw connector heads 27 of the first screw connectors 19 engage in the first screw connector head receptacles 26, so that they are present at a distance from the roof 2.

FIG. 3 shows a schematic representation of the fastener 11 for the first embodiment of the roof rack 3. Only the adapter component 17 and the first screw connectors 19 and the second screw connectors 20 can be seen. A support surface 28 can now be seen, on which the roof rail 5 is supported with its bottom wall 9. It can also be seen that the support wall 15 protrudes over the support surface 28 in the direction of the roof rail 5. The extension 14 also protrudes over the support surface 28, namely in the longitudinal direction of the roof rack 3 or the roof rail 5.

In addition to the first screw connector head receptacles 26, the adapter component 17 has second screw connector head receptacles 29, in which screw connector heads 30 of the second screw connectors 20 are arranged. The second screw connector head receptacles 29 are adapted in shape and dimensions to the screw connector heads 30, so that the screw connector heads 30 and thus the second screw connectors 20 are fixed in a form-fitted, rotationally fixed manner with respect to the adapter component 17. This achieves a simple and quick attachment of the roof rack 3 to the roof 2 of the motor vehicle 1.

Figures 4, 5:
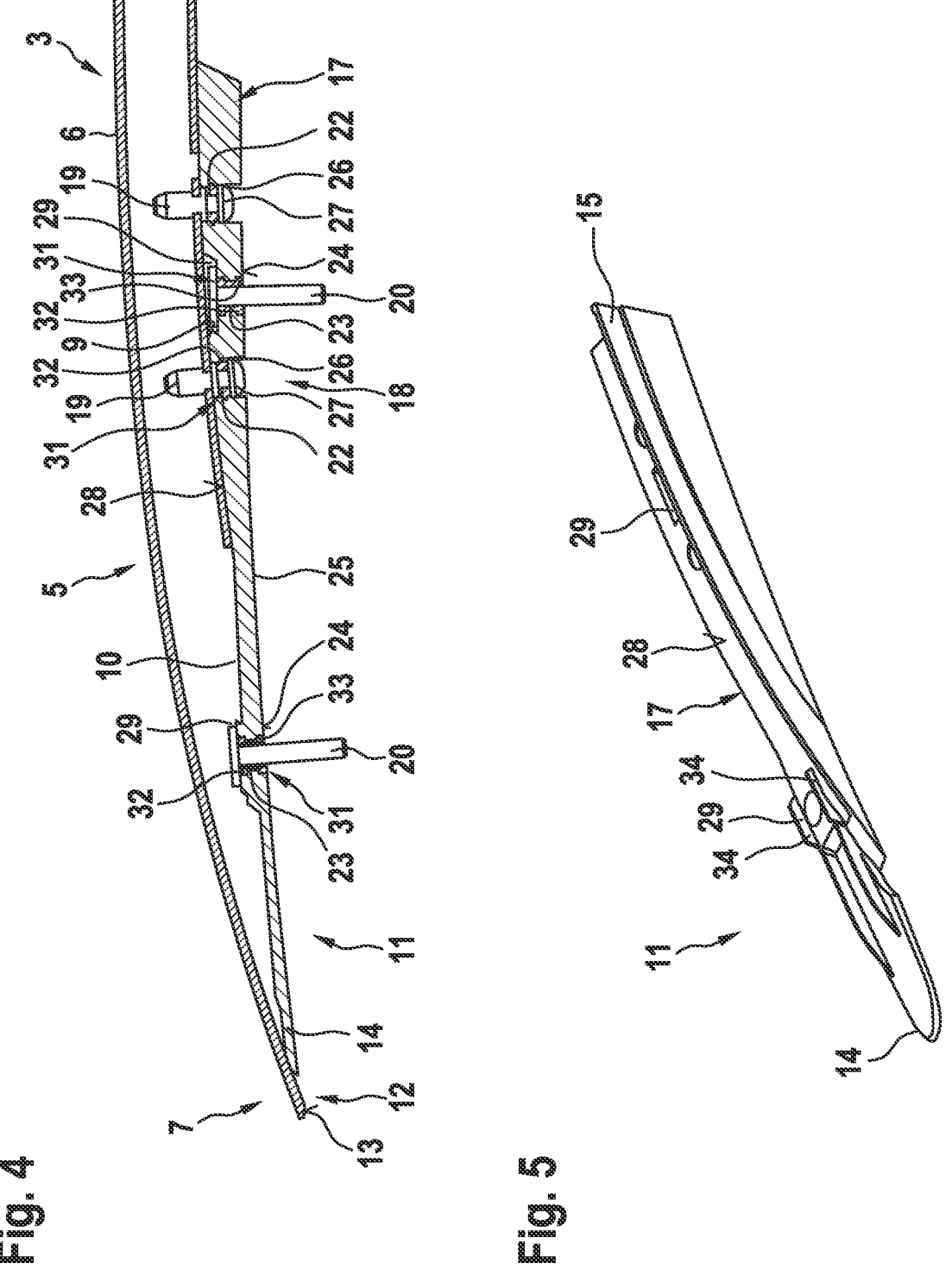

FIG. 4 shows a schematic longitudinal sectional view of the roof rack 3 in a second embodiment. In principle, reference is made to the above explanations regarding the first embodiment and only the differences are discussed. These lie in the fact that the fastening device 18 is now no longer designed as a continuous component, but has several reinforcing elements 31 which are accommodated at a distance from one another in the adapter component 17 and have the fastening recesses 22 and 23. The reinforcing elements 31 are in the form of bushes, each of which has at least one form-fitting collar 32 which is overmoulded with the adapter component 17.

Those reinforcing elements 31 which receive the first fastening recesses 22 only have a single form-fitting collar 32, which is arranged approximately centrally or exactly centrally in the direction of their respective longitudinal centre axis. The reinforcing elements 31 in which the second fastening recesses 23 are formed, on the other hand, have a further form-fitting collar 33 which is formed at a distance from the form-fitting collar 32. The adapter component 17 engages between the form-fitting collar 32 and the further form-fitting collar 33 to fix the respective reinforcing element 31. It is particularly preferred that the further form-fitting collar 33 is flush with the underside 25 of the adapter component 17, so that the further form-fitting collar 33 forms the aforementioned edge surface 24.

FIG. 5 shows a schematic representation of the fastener 11 for the second embodiment of the roof rack 3. Once again, reference is made to the above explanations and only the differences from the first embodiment are discussed. These are essentially due to the design of the second screw connector head receptacle 29. Whereas in the first embodiment there was a recess for forming the second screw connector head receptacle 29 in the adapter component 17, the second screw connector head receptacle 29 for the second form of expression is delimited only by two webs which preferably run parallel to one another. These two webs 34 serve to positively hold the respective second screw connector 20 so that it is fixed in a rotationally fixed manner with respect to the adapter component 17.

The described design of the motor vehicle 1 or of the roof rack 3 enables a simple and quick mounting of the roof rack 2 on the roof 2 of the motor vehicle. At the same time, the fastener 11 can be produced at low cost and ensures reliable load transfer from the roof rail 5 to the roof 2.

LIST OF REFERENCE SIGNS

1 Motor vehicle
2 Roof
3 Roof rack
4 Protective film
5 Roof rail
6 Top side
7 End
8 Side wall
9 Bottom wall
10 Recess
11 Fastener
12 Foot area
13 Foot surface
14 Extension
15 Support wall
16 Side wall extension
17 Adapter component
18 Fastening device
19 1st screw connector
20 2nd screw connector
21 Recess
22 1st fastening recess
23 2nd fastening recess
24 Edge surface
25 Underside
26 1st screw connector head receptacle
27 Screw connector head
28 Support surface
29 2nd screw connector head support
30 Screw connector head
31 Reinforcing elements
32 Form-fitting collar
33 Form-fitting collar
34 Web

The invention claimed is:

1. A roof rack for a motor vehicle, including:
at least one roof rail;
at least one fastener for end fastening of the roof rail to a roof of the motor vehicle, the fastener having a fastening device which is fastened to the roof rail and can be fastened to the roof; and
an adapter component which accommodates the fastening device at least partially,
wherein the adapter component is designed as an injection moulded component and the fastening device is present in overmoulded form in the adapter component,
wherein the fastening device has a plurality of first fastening recesses and a plurality of second fastening recesses, the first fastening recesses being provided and designed for receiving first screw connectors serving to fasten the fastener to the roof rail and the second fastening recesses being provided and designed for receiving second screw connectors serving to fasten the fastener to the roof,
wherein each of the second fastening recesses is respectively embraced by an edge surface of the fastening device which is aligned with an underside of the adapter component in the direction facing away from the roof rail, and wherein the adapter component has first screw connector head receptacles in which heads of the first screw connectors are arranged at a distance from the underside of the adapter component.

2. The roof rack according to claim 1, wherein the fastening device is designed as a continuous component or has a plurality of reinforcing elements accommodated at a distance from one another in the adapter component and having the fastening recesses.

3. A roof rack for a motor vehicle, including:

at least one roof rail;

at least one fastener for end fastening of the roof rail to a roof of the motor vehicle, the fastener having a fastening device which is fastened to the roof rail and can be fastened to the roof; and an adapter component which accommodates the fastening device at least partially, wherein the adapter component is designed as an injection moulded component and the fastening device is present in overmoulded form in the adapter component, wherein the fastening device has a plurality of first fastening recesses and a plurality of second fastening recesses, the first fastening recesses being provided and designed for receiving first screw connectors serving to fasten the fastener to the roof rail and the second fastening recesses being provided and designed for receiving second screw connectors serving to fasten the fastener to the roof, and wherein the adapter component has first screw connector head receptacles in which heads of the first screw connectors are arranged at a distance from the underside of the adapter component, and wherein the first screw connector head receptacles are closed by the roof of the motor vehicle after arrangement of the roof rack on the motor vehicle.

4. A roof rack for a motor vehicle, including:

at least one roof rail;

at least one fastener for end fastening of the roof rail to a roof of the motor vehicle, the fastener having a fastening device which is fastened to the roof rail and can be fastened to the roof; and an adapter component which accommodates the fastening device at least partially, wherein the adapter component is designed as an injection moulded component and the fastening device is present in overmoulded form in the adapter component, wherein the fastening device is designed as a continuous component or has a plurality of reinforcing elements accommodated at a distance from one another in the adapter component and having the fastening recesses, and wherein the reinforcing elements are designed as bushes each having at least one form-fitting collar which is overmoulded with the adapter component at least partially, wherein the bushings having the second fastening recesses each additionally have a further form-fitting collar spaced apart from the form-fitting collar, and the adapter component engages form-fittingly between the form-fitting collar and the further form-fitting collar.

5. A roof rack for a motor vehicle, including:

at least one roof rail;

at least one fastener for end fastening of the roof rail to a roof of the motor vehicle, the fastener having a fastening device which is fastened to the roof rail and can be fastened to the roof; and an adapter component which accommodates the fastening device at least partially, wherein the adapter component is designed as an injection moulded component and the fastening device is present in overmoulded form in the adapter component, and wherein the roof rail has a top side facing away from the fastener, as seen in section, side walls extending from the top side and a bottom wall resting on a support surface of the fastener.

6. The roof rack according to claim 5, wherein first fastening recesses engage through the support surface.

7. The roof rack according to claim 5, wherein the adapter component has an extension which projects beyond the support surface and engages in a foot region of the roof rail facing the roof, the foot region having a foot surface facing the roof, which foot surface engages around the extension in a U-shape and is flush with the underside of the adapter component or projects beyond it in the direction facing the roof.

8. The roof rack according to claim 5, wherein the adapter component has at least one support wall which projects beyond the support surface and against which one of the side walls of the roof rail or a side wall extension extending from one of the side walls of the roof rail bears for lateral guidance of the roof rail with respect to the adapter component.

9. The roof rack according to claim 8, wherein the one side wall and the side wall extension are connected via a bend of the roof rail overlapping the support wall.

\* \* \* \* \*